Patented July 23, 1946

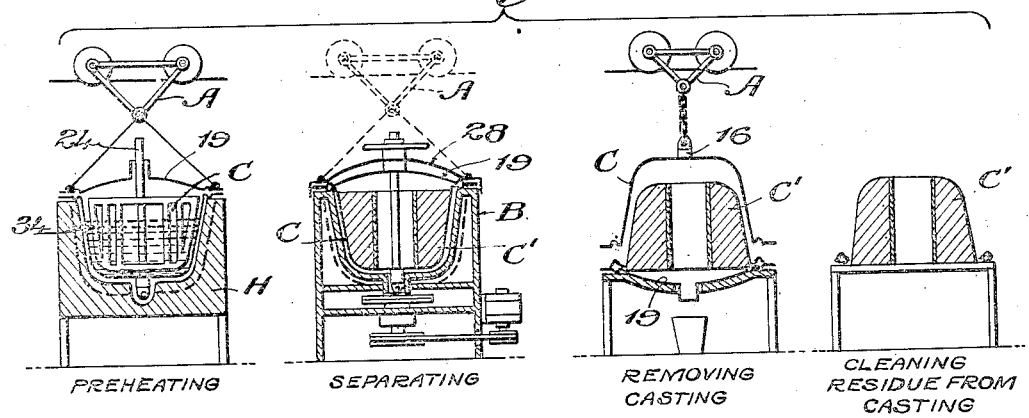
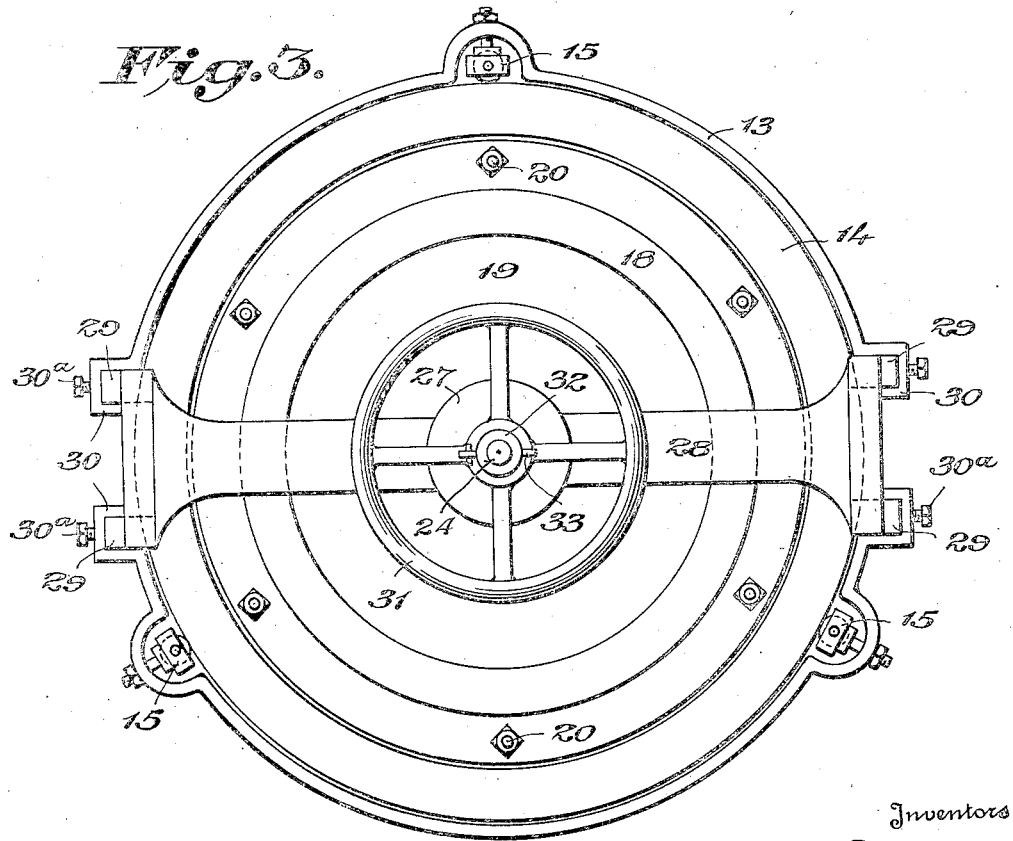

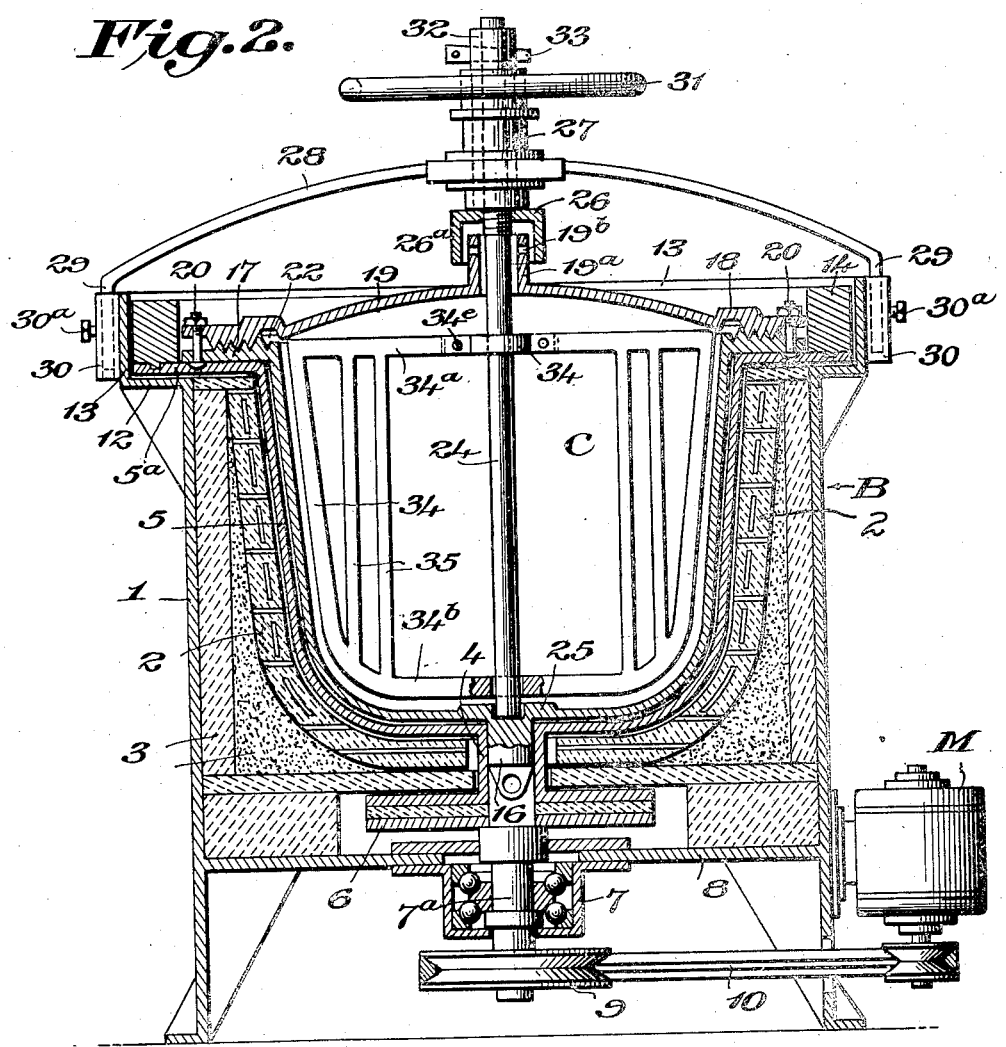

2,404,364

UNITED STATES PATENT OFFICE 2,404,364

APPARATUS FOR RECOVERING METALS

Thomas B. Cooper, Philadelphia, Pa., and William H. Schulz, Weehawken, N. J., assignors to Cooper Development Company, New York, N. Y., a firm Application July 24, 1942, Serial No. 452,210

6 Claims. (Cl. 266—37)

This invention relates to an apparatus for expeditiously and economically separating and recovering low-fusion metals and alloys such as tin, type metal and the like, from "dross" or "scruff" skimmed from the surface of molten plating baths of melting pots.

In industrial plants where the so-called white metals are applied in a molten state to plates or sheets, and in type casting, die casting and the like, the scruff or dross contains a high percentage of the white metal, as well as varying amounts of oxides, impurities, and extraneous matter. For example, in the procedure of hot dipped tin plating, approximately 20% of the bath of molten metal in the tinning pot actually adheres to the steel plates, while the remaining 80% is air scruffed and is skimmed off as dross along with other foreign matter. That is to say, the effect of rapidly feeding the sheets to be plated, into the molten bath, results in the aeration and cooling of the upper portion of the bath to the extent that the upper surface thereof, becomes filled with froth due to agitation and cooling, thus producing dross which must be periodically removed to insure the continued efficiency of the plating operation. The dross or scruff is skimmed from the surface of the molten bath and this heavy viscous conglomerate is manually deposited in a receptacle, or make-shift receptacle, and according to prevailing practice, is subsequently remelted in reverberatory or other furnaces in an attempt to recover the valuable white metal. However, procedures of this type are extremely wasteful for the reason that considerable quantities of white metal are lost in the inevitable oxidation, the formation of metallic compounds, and volatilization, inherent to such processes, and, moreover, it is frequently necessary to further subject the recovered metal to additional refining processes to make it available for re-use.

One means heretofore proposed for reclaiming low-fusion metals while remedying the foregoing disadvantages, provided a reclaiming apparatus in the form of a rotary heating furnace which effected the separation of metals of different density by centrifugal force, and then drew off the metals in their molten state when rotation was stopped. Although apparatus of this type has proved very efficient where volume in capacity at a given period of time was not a factor, nevertheless, since the furnace must be charged; the charge melted; the furnace operated; and then drained; the repetition of these successive steps rendered this step by step or intermittent method of recovery relatively slow due to the mechanical limitations of the apparatus itself. These several steps including the drawing off of the metal are entirely eliminated by the present invention.

Accordingly, the present invention has primarily in view a novel method and apparatus for speedily recovering white metals such as tin, lead, zinc, antimony, bismuth and alloys thereof in the "massive" state from the dross or scruff skimmed from melting pots, and which not only results in considerable economy of operation, but also makes possible the recovery of a maximum percentage of white metal with only a minimum of subsequent mechanical operations to provide substantially pure castings of the desired metals and/or alloys which are ready for re-use without further treatment. In that connection, the invention contemplates a heated primary reclaiming apparatus including a centrifugal cradle adapted to receive a removable receptacle or pot which is interchangeable with other pre-charged and pre-heated receptacles, so that substantially continuous reclaiming operations may be carried out in the reclaiming apparatus. That is to say, while the dross or scruff in the receptacle positioned in the cradle is being treated, other receptacles may be charged and pre-heated. And, when the charge in the cradled receptacle has been separated and cast such receptacle can be removed and another pre-charged and pre-heated receptacle substituted in its place. Thus, according to the present invention, a primary reclaiming apparatus with controlled heat is adapted to receive and centrifugally operate a closed receptacle or pot containing molten metal to bring about the separation of metals of different density from light non-metalliferous residues and extraneous substantances in a period of two to three minutes, the molten mass taking the form of a hollow ring which is "frozen" or formed into a tubular casting by reducing the temperature while maintaining the centrifugal action. When the casting is thus formed, the receptacle including the casting is removed, as previously indicated, and the casting is lifted or dumped out. This casting has the desired metal at the outer side thereof, while the non-metallic residue and extraneous substances are disposed at the inner face thereof so that the casting may be readily and easily subjected to a washing, shaving, or scraping operation to remove the residue. It will therefore be apparent that the method and apparatus of the present invention effects the separation of the metal from the residue by centrifugal force, while the lighter residue in the absence of atmospheric oxygen becomes separated from the metal by centrifugal action so that no valuable metal is lost by compounding, oxidation, or volatilization. This method of reclaiming tin from scruff is a radical departure from the present pyro-metallurgical procedure of employing high temperature reverberatory and blast furnaces, because it renders the tin or other valuable metal content of the scruff available without metalliferous residues such as tin ash, thereby eliminating all costs incident to reclamation and handling of such residues and avoiding consequent volatile losses of tin incident to current methods of reclaiming by high temperature processes.

A further object of the invention is to provide a novel form of interchangeable receptacle or pot adapted for removable mounting in the centrifugal cradle of the heater of the reclaimer and provided with a special form of cover which contributes to the ready separation of the heavier metals from the lighter metals together with novel agitating means which are readily removable from the receptacle with the casting.

An example of the procedure involved, and a preferred and practical embodiment of the apparatus is shown in the accompanying drawings, in which:

Fig. 1 is a diagrammatic view illustrative of the several principal stages of the method involved.

Fig. 2 is a vertical sectional view of the reclaiming apparatus.

Fig. 3 is a top plan view of the structure shown in Fig. 2.

Fig. 4 is an enlarged detail sectional view showing the joint between the cover and the separating basket.

Fig. 5 is a detail view of the connection between the agitator and its control shaft.

Similar reference characters designate corresponding parts throughout the several figures of the drawings.

In industrial plants where the present method and apparatus may be used, such equipment as a travelling hoist, pivoted crane or other lifting apparatus is usually available. Apparatus of the first type illustrated in the diagrammatic layout, Fig. 1, is designated generally as A, and includes the usual carriage operating on overhead rails or tracks and suitable chains equipped with grab hooks or the like. The primary reclaiming apparatus designated generally as B includes a removable separating receptacle or pot C which is rotated, as will hereinafter more fully appear. This receptacle is one of a series of similar receptacles or pots which may be interchangeably fitted in the centrifugal cradle of the apparatus B. For example, as observed from Fig. 1, the pot C may be supported in a pre-heater designated generally as H. This pre-heater may be of any appropriate type wherein heat is supplied by controlled electrical current, or flame propagated from oil or gas. The pot C is preliminarily supported in the pre-heater with the agitator and its shaft in place and its cover removed so as to be charged with dross, scruff, or scrap, to be melted, with or without appropriate chemical reagents. The cover is then firmly placed in position and heat is applied to a degree sufficient to remove water from the scruff and convert the chunks of conglomerate to a hot liquid mass.

Assuming that the primary reclaiming apparatus B has its centrifugal cradle empty, the transfer apparatus A, by means of its chains and hooks, which latter engage with suitable eyes fitted to the pot, lifts the pot C from the pre-heater H and transfers it to the reclaimer B. After the pot C is in the apparaus B, melting heat is continued and the pot is subjected to centrifugal action which causes the metal to be separated from the residues and also causes iron and heavy metals to be separated from the white metal.

As will hereinafter appear, the iron and heavier metals are collected and trapped in a recess at the inner periphery of the cover and the white metal and residues are formed into a tubular or hollow substantially cylindrical casting C' when the heat is reduced below the fusion point of the metal or alloy, near the end of the centrifuging period. In connection with the substantially cylindrical casting C' it may be pointed out that when the pot C or crucible is rotated or "centrifuged," the molten metal is caused to assume a vertical position along the sides of the vessel. The ultimate effect of rotating the molten metal is to produce a central recess having a parabolic profile but said profile is so close to being a straight line, that for purposes of illustration it is sufficient to show the mass of molten metal as being substantially a cylinder. After the molten metal has assumed the form indicated the pot or crucible is then removed from the reclaimer and manipulated in an appropriate manner with the aid of the hoist to recover the trapped cast heavy metal ring and the massive tubular casting of white metal. One method of handling the pot containing the castings is to remove the superstructure from the cover, draw out the agitator shaft and invert the pot on a suitable table and then lift the pot from the castings. In this way, any reagents used in promoting reaction in the pot during centrifuging may be easily removed. Alternatively the pot may be placed on the table or stand in an upright position and the cover lifted off. The hoisting means may then be used to raise the trapped heavy metal ring and also engage the agitator which is embedded in the massive casting to lift out the latter.

Since, as previously indicated, the light metal to be recovered forms the portion of the tubular casting nearest the upwardly and outwardly inclined wall of the receptacle and the residue is collected at the inner surface of the casting, the said inner surface of the latter is then subjected to a mechanical cleaning operation such as washing, scraping or equivalent action for removing the residue. In some cases this cleaning step may be omitted. For example, if quantity and quality of the residue is insignificant or unimportant, the casting can at once be remelted and the residue being light will float and can be skimmed off from the melting pot as dross and again reclaimed in the apparatus B. The casting, upon being melted for re-use releases the agitator so that it can be used over and over again.

Referring now more particularly to the primary reclaiming apparatus B, it will be observed that the same includes a suitable casing 1 containing a heating chamber or cavity formed by a wall 2 of refractory tile or the like and containing electric heating elements connected with a source of manually and thermostatically controlled electrical current. The range of temperatures employed obviously depend on the fusion points of the metals being reclaimed. Suitable insulation 3 is provided between the outer surface of the wall 2 and the casing 1 to retain heat supplied to said wall. The bottom of the cavity formed by the wall 2 is provided with an axial opening thereby to receive the hollow hub 4 of a rotatable cradle 5 which conforms closely in shape and contour to the interior profile of the wall 2.

The hub 4 of the cradle is supported on a disc or plate structure designated generally as 6 and including an intermediate layer of insulation. This structure 6 forms part of a thrust bearing 7 supported in the horizontal strut or bottom wall 8 of the casing. The thrust bearing assembly which includes the disc 6 also includes the shaft 7a carrying a pulley 9, or its equivalent, adapted to be connected by the driving element 10 with a motor M mounted on the exterior of the casing 1. It will therefore be apparent that the cradle 5 is rotatably supported in the heating cavity of the wall 2 for rotary or spinning movement. The upper portion of the casing 1 is provided with a horizontally offset flange 12 connecting with a vertical peripheral flange 13. The upper edge of the cradle 5 is also provided with an offset flange 5a which extends horizontally and overlies the upper edge of the wall 2, the insulation within the casing, and the flange 12 of the casing, as shown in Fig. 2. The said flange 5a of the cradle is provided over a portion of its depth with a gyroscopic balance ring 14, which is interlocked therewith by suitable dowels. This ring has its outer face engaging with adjustable roller bearings 15 located in offset pockets at suitable angular distances apart on the vertical flange 13. This form of balance materially aids in steadying the rotational movement of the cradle in the casing, especially when the cradle supports a receptacle C containing the charge of molten metal.

Each receptacle C is shaped to conform to the interior contour of the cradle 5 and has its side wall inclined upwardly and outwardly, that is substantially after the fashion of an inverted cone. Also, each receptacle is provided on its bottom surface with an axial boss 16 formed with an eye which fits into the socket formed by the hollow hub 4 of the cradle thereby automatically centering the receptacle when it is placed within the cradle. The upper edge of the receptacle or pot C is provided with an offset flange 17 whose underside is intended to rest on the flange 5a of the cradle when the receptacle is positioned in the heating cavity of the wall 2. The upper face of the flange 17 is of special formation to cooperate with a special formation on the under or inner face of the flange 18 of the cover 19.

As will be more readily apparent from Fig. 4, the cooperating flanges 17 and 18 are adapted to be secured together at their outer edges by suitable fastenings 20. The heads of these fastenings fit into mating depressions or sockets in the flange 5a to assist in interlocking the pot with the cradle. Inwardly of said fastenings adjacent faces of the flanges 17 and 18 are of saw-tooth formation, as indicated at 21 and inwardly of the saw-tooth formation the said flanges 17 and 18 are formed with complemental walls which form a heavy metal recess 22. Access between the recess 22 and the interior of the receptacle or basket is established by a relatively small or restricted annular clearance 23. The complemental saw-tooth portions 21 of the flanges 17 and 18 are preferably provided with suitable packing to prevent metal leakage through the joint from the heavy metal recess 22. In connection with this heavy metal recess, it will of course be understood that during the centrifuging operation some of the light metal will enter said recess. However, such light metal as may enter said recess is displaced or pushed out as the heavy metals enter. It will of course be understood that the receptacle or pot C and its cover provide a separating and reaction chamber which is closed to free atmospheric oxygen.

The central portion of the cover 19 is provided with an upstanding collar 19a for receiving an agitator shaft 24 with sufficient clearance or tolerance to provide a passage for venting such gases as may be formed in the reaction chamber. This passage opens or discharges at the upper end of the collar but gases may also escape through the side ports 19b if the end of the collar is closed, as will presently appear. The lower end of the shaft 24 is centered in the socket of a boss 25 formed axially of the inside bottom face of the pot C.

The portion of the shaft 24 which projects through the collar 19a is provided with a vent shield 26. This shield includes a horizontal body portion and a depending skirt 26a of larger interior diameter than the external diameter of the collar. The horizontal body portion of the shield overlies the upper end of the collar while the skirt, lying in overlapping relation to the collar but spaced therefrom, shields the parts 19b. As will be seen from the drawings, the horizontal body portion of the shield 26 is provided with a central opening which is internally threaded to engage a threaded portion of the shaft so that when the shield is rotated relative to the shaft it may be moved to engage or disengage the upper end of the collar 19a. The purpose of this arrangement is to serve as a clutch for releasably connecting the cover 19 with the shaft 24 if and when such occasion becomes desirable. Normally, the shaft 24 and its inter-connected agitator frame are intended to rotate freely and independently of the receptacle or pot C so that the movement of the shaft and the agitator may be intermittently braked relative to the receptacle and the spinning mass of molten metal.

The portion of the shaft 24 which projects beyond the body of the shield 26 is mounted in a journal 27 carried by a bridge 28. This bridge is provided with downturned ends 29 adapted to slidably interfit in guides 30 carried on the outer face of the vertical wall 13 of the casing so as to be removable from the casing. Suitable clamping or set screws 30a are provided for securing the ends 29 of the bridge in the guides 30.

The hollow shaft 24 above the journal 27 is equipped with a hand wheel brake 31 having a hub 32 surrounding the hollow shaft, the said hub being adapted to be connected to the agitator shaft by the removable locking pin 33.

The portion of the shaft 24 within the receptacle or pot C is connected with an agitator frame 34 whose side members conform to the profile of the receptacle and whose top and bottom portions 34a and 34b are connected by spaced agitator bars 35. The top arm 34a of the agitator is provided with an enlarged central portion 34c having a key opening or slot 34d adapted to receive a transverse key 24a carried by the shaft 24. The transverse key 24a of the shaft is adapted to be connected with the upper frame member of the agitator by means of the removable bolts 34e which pass through complemental aligned openings respectively in the upper arm of the agitator and the key 24a. The purpose of this arrangement is to connect the shaft 24 with the agitator frame 34 so that the shaft and frame may rotate together during the centrifuging operation but will permit of disconnecting the frame from the shaft to permit the latter's withdrawal when the casting has congealed or set due to sufficient cooling. The agitator frame is of course left embedded in the casting until the latter is remelted although the shaft may be readily withdrawn together with the bridge 28, etc., which constitute the superstructure of the reclaimer.

The operation or procedure involving the use of the reclaimer B and its appurtenances, is as follows:

One of the receptacles C which may be supported in the pre-heater H, and having the agitator 34 and the shaft 24 therein, but with the cover removed, may be charged with lumps or chunks of dross or the like containing material to be recovered together with such deoxidizing, refining, or reducing admixtures as may be necessary or desirable. The purpose of these admixtures is to provide suitable reagents for converting a substantial percentage of iron and other metallic impurities to metallic compounds which may be readily separated from the tin or other white metal in the reaction chamber of the receptacle during the working of the process. Some melting of the conglomerate mass charged into the receptacle may take place as charging proceeds. However, after the receptacle has been charged with the desired quantity of the mass to be recovered, the cover 19 is then placed thereon and the charge is pre-heated to the molten state and may be maintained in this condition by thermostatically controlled temperatures whose degree depends on the fusion point of the material being processed.

Assuming that the charge in the receptacle C mounted in the pre-heater is in proper condition for transfer to the primary reclaiming apparatus B the said receptacle C may be lifted by the hoisting apparatus and placed into the cradle 5 positioned in the heating cavity of the wall 2. The superstructure comprising the bridge 28 and journal 27 may then be placed on the casing of the reclaiming apparatus as heretofore described and the hand brake wheel may be keyed to the upper end of the shaft 24. Electrical heat furnished by the wall 2 maintains the molten metal in the receptacle in a fluid state as the receptacle rests in the cradle and the latter may then be rotated by energizing the electric motor which will drive the cradle through the means heretofore described. When the rotation or spinning of the cradle and receptacle start, the material to be treated is in a limpid liquid mass of suitable depth within the receptacle. As rotation or spinning proceeds, the molten mass will begin to move toward the upwardly inclined side wall of the receptacle and as a result, the fluid mass quickly assumes the general characteristics of a hollow cylinder. Since the agitator 34 is normally free with respect to the receptacle C, it will be apparent that when the receptacle and its molten mass rotate the agitator will be carried along with the mass. During the rotation of the receptacle and the mass, the movement of the agitator 34 may be arrested intermittently at brief intervals by manually grasping the hand wheel brake 31 to thus effect complete agitation of the elements of the molten mass and extraneous matter and assisting in their separation. This method of mechanically separating finely dispersed molten metal from greasy viscous substances accomplishes at a very low speed of rotation, a substantially complete separation and recovery of the tin or other white metal from the extraneous viscous matter. After complete separation has taken place between the metal and the residue, the retarded free-rotating stirrer is then released and revolves with the rotary motion of the material in the receptacle, thus preventing subsequent entrainment of molten free metal in the extraneous residue.

During the period of centrifuging, the metals of greatest density in the mass ride up the inclined side wall of the receptacle C and pass through the relatively constricted annular opening 23 of the heavy metal recess 22 to form a ring of heavy residues which when later chilled may be broken off by a hammer or other tool. Such lighter metals as may enter the recess are of course displaced by the heavier metals. The body or bulk of the lighter metals, however, is thrown against the side of the pot while the residues, being lighter than the metal, will move by centripetal force toward the inner portion of the mass.

After a predetermined period of rotation or spinning at relatively low speed, as distinguished from higher speeds which would be necessary without the agitator, and without interruptions caused by braking the agitator frame, and while the fluid mass assumes susbtantially the form of a hollow cylinder, the heating current supplying the wall 2 of the cavity is turned off. Consequently, a reduction in temperature results so that the previously fluid mass freezes, chills, or congeals sufficiently to set and assume the form of a main tubular casting consisting of white metal and residue and a secondary casting of heavy metal trapped in the recess 22. Continuing rotation of the receptacle after turning off the electric current to the heating elements in the wall 2 effects a relatively rapid reduction in temperature in the receptacle which brings about relatively quick setting or freezing of the molten metal in the form of a casting.

When the casting has been formed, the electric motor is turned off to stop the rotation of the cradle and the receptacle. The hand brake wheel 31 may be disconnected from the shaft and along with the bridge 28 which constitutes the superstructure may be removed from the reclaimer. The shaft 24 may be removed as a part of this operation by leaving the key 32 in position to connect the hub of the wheel with the shaft. Alternatively, the shaft 24 may be lifted out separately after the hand brake wheel 31 has been removed.

When the superstructure has thus been removed from the receptacle containing the castings, the said receptacle may be lifted by the hoisting means from the cradle and transferred to a suitable work table. The receptacle may be manipulated to a position so that the boss 16 at the bottom of the receptacle and having an eye may be grasped by the hoisting apparatus so as to invert the receptacle and the cover including the casting whereupon the cover may be unfastened from the receptacle. The receptacle may then be lifted from the cover and the castings, and such fluid admixtures remaining in the receptacle may be drained through appropriate channels or gutters in the table to be collected in receptacles for re-use. The heavy metals collected in the recess at the top of the crucible are removed as a part of the cleaning or finishing operation. As previously indicated these heavier metals exist in the form of a ring and they may be separated from the main body of the casting by wedging with a chisel, prying with a bar or fracturing with the blow of a hammer. The connection between the heavy metals and the main casting will not be a continuous one nor will it be of a heavy cross-sectional area and hence can be removed easily by the means indicated. Furthermore, the main casting will be of a true white metal alloy and will remain comparatively soft and ductile, while the heavy metals and impurities, by their very nature as impurities, will fracture and sluff off with little or no force required. After the hollow casting has been deprived of the heavy metal ring or fringe, it then may be transferred to a cleansing station which may be another table, rack or other suitable support. In that connection, it will be recalled that the agitator frame 34 is still embedded in the casting. Such portions, if any, of the agitator frame as may be exposed may be utilized to assist in the handling of the casting in its transfer to the cleansing station.

At the cleansing station the operator examines the casting and determines what further mechanical treatment is necessary to remove the undesirable residue from the interior of the hollow tubular casting. For example, if the residues are found to be mainly dirt, they may be removed by a simple washing operation. On the other hand, if the residues contain extraneous particles the same may be removed by washing, scraping, or shaving. If the operator decides that there is insufficient extraneous material in the residue to justify pursuing the cleaning operation, the casting may then be remelted and the agitator frame then recovered for re-use. If any residues are removed by scraping and they appear to contain white metal, these scrapings may be returned as dross to one of the receptacles which is being charged and pre-heated preliminary to treatment in the reclaimer and thus go through the reclaiming process a second time.

In connection with the free rotatable agitator frame 34 it may be pointed out that the same may be manipulated, that is, retarded and released, during relatively slow rotational speed of the receptacle C for mixing purposes and establishing intimate contact between the reagents employed and the metal being processed. When the agitator is retarded at higher rotational speeds of the receptacle C the effect is to release the mechanical "shot" or globules of free molten metal from the mass while at the same time preventing compacting of the heavier residues containing substantial quantities of the "shot."

The purpose of providing releasable clutch means between the agitator shaft and the cover 19 of the receptacle C through the shiftable vent shield 26 is to temporarily lock the agitator with the receptacle so as to rotate therewith and then release it manually while braking pressure is applied to the hand wheel. Connecting the agitator with the receptacle in the manner just described is seldom required for the reason that since the agitator frame 34 is normally free relative to the receptacle, the said frame will rotate with the molten mass in the receptacle. Whether or not the agitator frame rotates at the same speed as the mass of fluid metal in the receptacle is not material since the primary concern is to be able to arrest the movement of the agitator frame and even hold it still for a brief interval for the purpose of dispersing the elements of the molten mass in order to free them and permit ready separation.

During the process of centrifugally effecting the separation of metals and dross the receptacle C is maintained closed to atmospheric oxygen, but any gases generated within the pot may readily escape through the collar 19a which discharges against the vent shield 26. The provision of the vent collar 19a prevents the accumulation of high pressures within the reaction and heating chamber, and since no appreciable oxygen remains in the closed pot or receptacle the metals to be recovered will not become oxidized.

The provision of the removable receptacle or pot in the primary reclaiming apparatus materially speeds up the procedure since other pots may be charged and pre-heated while the pot in the primary apparatus is being subjected to centrifugal action. Thus the primary apparatus is always assured of an adequate supply of charged receptacles.

A further and unique feature incident to the reclaiming apparatus B is that it may be made portable. That is to say, the reclaimer B may be mounted on a motor truck or the like, equipped with an electric generator to furnish current for the heating elements and to drive the reclaimer motor M to spin the cradle. Many newspapers, printing plants and the like are scattered throughout the country in places remote from facilities to reclaim the metal from type-metal and like drosses. In situations of this sort, it is necessary for the type-metal to be sent long distances for reclamation. By the use, however, of the reclaimer B on a portable apparatus the reclaiming of type metal may be accomplished at the source with considerable economy.

We claim:

1. An apparatus for reclaiming white metals from dross including, a casing having a heating cavity, a cradle rotatably supported in said cavity, means for imparting rotary movement to the cradle, a receptacle having an upwardly and outwardly inclined side wall, said chamber closed to the atmosphere and removably fitted in said cradle and adapted to contain molten metal to be separated, an agitator mounted to rotate freely within the receptacle, and means for retarding the agitator relative to the rotation of the receptacle and the molten metal.

2. An apparatus for recovering white metals from dross including, a casing having a heating cavity provided with a bottom opening, a cradle in said cavity having a sub provided with a centering socket and projecting through said opening, means for rotating said hub to impart rotational movement to the cradle, a molten metal receptacle including an upwardly and outwardly inclined side wall and having an axial bottom boss fitting into said centering socket, a cover for said receptacle, cooperating recess means on the cover and the receptacle forming a fluid tight joint and a heavy metal recess accessible to the interior of the receptacle through a restricted annular passage, agitating means within the receptacle mounted to rotate independently thereof, and means for retarding the movement of the agitating means relative to the receptacle.

3. An apparatus for recovering white metals of the low fusion group from dross including, a stationary casing having a heating cavity provided with a bottom opening, a cradle arranged in said cavity and including a receptacle like body portion and an upper offset flange, means extending through said bottom opening of the heating cavity for rotatably supporting the cradle in the cavity, a gyroscopic balance ring carried by the offset flange of the cradle, roller means on the casing for engaging the outer surface of said balance ring, and a molten metal containing receptacle removably mounted in said cradle.

4. An apparatus for reclaiming white metals of the low fusion group from dross comprising, a stationary casing, wall means within the casing having heating elements embedded therein, said wall means providing a heating cavity, a receptacle like cradle rotatably mounted in said heating cavity and having an upper flange, cooperating balance means respectively on said flange and casing for steadying the rotational movement of said cradle, a molten metal receiving receptacle removably mounted in said cradle, said molten metal receptacle comprising an upwardly and outwardly inclined side wall and a peripherally offset flange, a cover for said molten metal receptacle having an axially located collar constituting a vent, agitating means within the receptacle including an agitator frame and a central shaft passing through said collar and bearing on the bottom of the receptacle, said agitating means being normally freely rotatable with respect to said receptacle, a bridge having its ends removably fitted to the casing and provided medially thereof with a journal for the agitator shaft, a vent shield carried by the bridge and overlying the mouth of said collar, and a hand wheel brake on said agitator shaft.

5. An apparatus for reclaiming white metals from dross including a casing having a heating cavity adapted to be maintained at controlled temperatures, a cradle rotatably supported in the heating cavity, a molten metal receiving receptacle having an upwardly and outwardly inclined side wall and removably mounted in the cradle, cover means for the receptacle, complemental recess means on the cover and receptacle forming a heavy metal receiving recess accessible to the interior of the receptacle through a restricted annular opening disposed substantially in the upper periphery of said receptacle, agitating means within the receptacle and rotatable freely relative thereto, means for selectively retarding the rotation of the agitator means relative to the receptacle and molten metal therein, and means for rotating the cradle and receptacle to cause the metal therein to be thrown toward the inner side of the receptacle to form a substantially hollow cylindrical molten mass of lighter metals in the receptacle while the heavier metals enter said recess through said annular opening located substantially at the upper periphery of the receptacle, said metals congealing into castings on reducing the heat to said cavity.

6. A portable apparatus for reclaiming white metals from dross, including a casing having a heating cavity supplied with heat from a controlled electrical source, a cradle rotatably supported in said cavity, means for rotating the cradle, a receptacle removable from said cradle and having an upwardly and outwardly inclined side wall and providing a chamber closed to the atmosphere, agitating means mounted to rotate freely in the receptacle, and means for retarding the agitator means relative to the rotation of the receptacle and molten metal therein.

THOMAS B. COOPER.
WILLIAM H. SCHULZ.